United States Patent [19]

Felber et al.

[11] 3,867,347

[45] Feb. 18, 1975

[54] PROCESS FOR THE MANUFACTURE OF PULVERIZABLE THERMOSETTING COATING AGENTS

[75] Inventors: Wilfried Felber, Grosswelzheim; Gerhard Morlock, Grossauheim, both of Germany

[73] Assignee: Deutsche Gold-Und Silber-Scheideanstalt Vormals Roessler, Frankfurt am Main, Germany

[22] Filed: July 24, 1973

[21] Appl. No.: 382,227

[30] Foreign Application Priority Data
July 26, 1973 Germany............................ 2236514

[52] U.S. Cl. ...... 260/63 UY, 260/32.6 R, 260/33.6, 260/42.52, 260/77.5 TB, 260/77.5 CR, 260/78.5 R, 260/80.73, 260/80.75, 260/86.1 E, 117/132 B, 252/182
[51] Int. Cl. ............................................. C08f 1/80
[58] Field of Search ......... 260/80.73, 80.75, 86.1 E, 260/63 UY, 77.5 CR, 77.5 TB, 78.5 R

[56] References Cited
UNITED STATES PATENTS
3,542,741   11/1970   Hartmann et al.................. 260/77.5
3,676,405   7/1972   Labana....................... 260/77.5 CR FOREIGN PATENTS OR APPLICATIONS
1,965,740   7/1971   Germany

*Primary Examiner*—Stanford M. Levin

[57] ABSTRACT

A process for the manufacture of pulverizable, thermosetting coating agents comprising mixtures of acrylate resins containing hydroxyl groups and blocked isocyanates. The blocked isocyanates are di- or polyisocyanates blocked with a lactam having about 4–12 carbon atoms in the ring. The blocked isocyanates have melting points of about 60°–150° C., and are used in an amount of about 0.1–0.9 equivalents of isocyanate groups based on the hydroxyl group content. The process is useful for preparing agents useful in coating compositions.

34 Claims, No Drawings

3,867,347

PROCESS FOR THE MANUFACTURE OF PULVERIZABLE THERMOSETTING COATING AGENTS

This invention relates to a process for preparing pulverizable, thermosetting coating agents comprising mixtures of acrylate resins containing hydroxyl groups and blocked isocyanates.

It is known in the art that acrylic monomers can be copolymerized with other monomers in the presence of radical catalysts and molecular weight regulators in substance polymerization processes at temperatures above 110° C. (DT-OS 1 965 740). Such processes can be used to prepare pulverizable resins having softening points of about 75°–100° C. and mean molecular weights of about 500–10,000. In addition to an ester of acrylic or methacrylic acid, the following substances containing hydroxyl groups can be used as comonomers: olefinic unsaturated monomers and/or unsaturated carbonic acids and/or substituted amides of acrylic or methacrylic acid, and/or monomers from the group styrene, α-methylstyrene, acrylonitrile, vinyl acetate, vinyl propionate, vinyl alkyl ether, methacrylonitrile, allyl acetate, vinyl chloride or vinylidene chloride. These resins can be subsequently reacted or mixed with a reactive component, for instance, a blocked isocyanate.

The known processes are not entirely satisfactory since they require that the conversion or mixing with the blocked isocyanates be conducted in a separate step. Moreover, a substantially homogeneous distribution of the two components is not readily achieved by means of a simple mixing operation at room temperature in a powdery state. On the other hand, admixing of the blocked isocyanate in a melt, for instance in a kneader, results in local overheating caused by heat of friction, which results in a premature partial cross-linking of the resin.

When the resulting resins are employed in compositions for electrostatic powder coating, the coatings are either non-uniformly cross-linked, or they have irregular surface characteristics.

Therefore, there exists a need in the art for a simpler process for preparing pulverizable, thermosetting coating agents, which, when applied to a substrate, exhibit improved coating properties.

Accordingly, this invention provides a process for the preparation of pulverizable, thermosetting coating agents. The agents are prepared by polymerizing an acrylate monomer mixture containing hydroxyl groups in the presence of a blocked isocyanate. More particularly, the process comprises preparing a resin-forming monomer mixture comprising at least one acrylate monomer having hydroxyl groups and dissolving in said monomer mixture about 0.1–0.9 equivalents of isocyanate groups based on the hydroxyl groups. The isocyanate groups are derived from at least one di- or polyisocyanate blocked with at least one lactam having about 4–12 carbon atoms. The blocked isocyanate has a melting point of about 60°–150° C. The monomer mixture containing the blocked isocyanate is polymerized at a temperature below about 120° C. in the presence of a conventional catalyst.

In a preferred embodiment of this invention, the isocyanate groups are about 0.2–0.5 equivalents based on the hydroxyl groups. In a further preferred embodiment, the isocyanate is blocked with ε-caprolactam. It is further preferred that the blocked isocyanate is a blocked urethane isocyanate.

In a particularly preferred embodiment of this invention, the monomer mixture having uniformly dissolved therein the blocked isocyanate is polymerized in two steps. In the first step, the mixture is polymerized at about 20°–120° C. to form a syrupy prepolymer. In the second step, the prepolymer is hardened in a layer having a thickness below about 20 mm at a temperature of about 20°–100° C.

According to this invention, the additional working step for admixing the blocked isocyanate with the acrylic resin is eliminated. Furthermore, a substantially homogeneous distribution of the two components, i.e., the acrylate resin containing hydroxyl groups and the blocked di- or polyisocyanates, can be obtained substantially without difficulty. Coating compositions containing the coating agents prepared according to this invention can be applied to substrates by electrostatic powder coating techniques, and the resulting coatings possess excellent mechanical characteristics, good gloss and satisfactory surface characteristics.

A completely unexpected feature of this invention is that the presence of the blocked di- or polyisocyanates in the resin-forming monomer mixture has substantially no adverse effects on the polymerization process. This is particularly true with regard to residual monomer contents which are so small that, in spite of the high content of the softening cross-linking components, the polymerized product can be easily ground at room temperature to such a fine particle size that the resulting powder flows freely, and exhibits substantially no tendency to form lumps. This is true in spite of the considerably lower polymerization temperatures and relatively short polymerization periods in comparison to the well-known method disclosed in DT-OS 1 965 740.

The monomers employed in the resin-forming monomer mixture correspond, to a considerable extent, to the well-known monomer mixtures for acrylate-based varnish resins. Typically, the monomer mixture comprises about the following proportions:

1. 50–90 percent by weight, preferably about 60–80 percent by weight, of at least one ester of methacrylic acid or acrylic acid with 1 to 20 carbon atoms in the alcohol component, preferably an aliphatic or cycloaliphatic alcohol;
2. 10–50 percent by weight, preferably about 20 to 40 percent by weight of at least one olefinically-unsaturated monomer containing hydroxyl groups and copolymerizable with (1);
3. 0 to 15 percent by weight, preferably about 1–10 percent by weight, of other copolymerizable monomers from the group of methacrylic acid, acrylic acid, methacrylic acid amide, acrylic acid amide, N-substituted methacrylic acid amide, N-substituted acrylic acid amide, styrene, α-methyl styrene, acrylonitrile, vinyl acetate, vinyl propionate, vinyl alkyl ethers having about 1–8 carbon atoms in the alkyl group, methacrylonitrile, allyl acetate, vinyl chloride or vinylidene chloride, the total of the percentages of (1), (2), and (3) equalling 100.

Among the esters of methacrylic acid or acrylic acid with 1 to 20 carbon atoms in the alcohol component, the methacrylic acid methyl ester is preferred. It is advisable that its portion with respect to the total monomer mixture be about 30 to about 60 percent by weight. In addition, it is advantageous to employ a softening ester of methacrylic acid or acrylic acid, for instance, acrylic acid methyl ester, acrylic acid ethyl ester, acrylic acid-n-propyl ester, acrylic acid isopropyl ester, acrylic acid butyl ester, acrylic acid-2-ethyl-hexyl ester, acrylic acid-n-octyl ester, acrylic acid dodecyl ester, methacrylic acid butyl ester, methacrylic acid hexyl ester, methacrylic acid-2-ethyl-hexyl ester, methacrylic acid decyl ester or methacrylic acid cyclohexyl ester.

Among the copolymerizable olefinically unsaturated monomers containing hydroxyl groups, the hydroxyalkyl esters of acrylic acid, and particularly those of methacrylic acid, are preferred. Examples are the 2-hydroxyethyl ester, 2-hydroxypropyl ester and 4-hydroxybutyl ester. In addition, appropriate hydroxy alkyl esters of maleic acid, fumaric acid or itaconic acid can be employed, typically, the hydroxyethyl, hydroxypropyl and hydroxybutyl esters.

In the resin-forming monomer mixture a "latent cross-linking component" is dissolved before polymerization. According to this invention, di- or polyisocyanates blocked with a lactam having about 4 to 12 carbon atoms in the ring are used as the "latent cross-linking component." The di- or polyisocyanates can be aliphatic, araliphatic or cycloaliphatic. Examples are hexamethylene diisocyanate, octamethylene diisocyanate, decamethylene diisocyanate, dodecamethylene diisocyanate, ω,ω'-diisocyanato-1,4-dimethyl benzene(p-xylylenediisocyanate) or isophorone diisocyanate.

Also well suited are the isocyanate-containing urethanes which are the reaction products of isophorone diisocyanate with suitable alcohols. These reaction products are formed as a result of the differing reactivities of the two NCO- groups of isophorone diisocyanate. As examples shall be mentioned the adducts formed by reacting two moles of isophorone diisocyanate with one mole hexanediol, decanediol, tetraethylene glycol, neopentyl glycol or 1,4-bis-hydroxy methyl cyclohexane, and the adducts from three moles of isophorone diisocyanate with one mole of trimethylol propane or hexanetriol.

The blocked di- or polyisocyanates to be employed in accordance with this invention are blocked with lactams having about 4 to 12 carbon atoms in the ring. Preferred is ε-caprolactam. Typical of other lactams which can be employed are capryl lactam or lauryl lactam. In each case, the di- or polyisocyanate to be employed and the blocking component to be employed are selected so that the melting point of the blocked di- or poly-isocyanate is about 60° to about 150° C. It is also important that the blocked di- or polyisocyanate to be employed is substantially soluble in the resin-forming monomer mixture, and expediently so at room temperature. Alternatively, manufacture of the blocked di- or polyisocyanates to be employed can be conducted in a monomer mixture containing hydroxyl-free monomers. In this event, the addition of olefinically unsaturated, hydroxyl-containing copolymerizable monomers takes place when the reaction of the isocyanate with the blocking component is terminated.

The blocked di- or polyisocyanates are employed in amounts such that about 0.1–0.9 equivalents, preferably about 0.2–0.5 equivalents, of isocyanate groups are provided, based on the hydroxyl groups in the resin-forming monomer mixture.

In the method according to this invention, the polymerization of the monomer mixture containing the latent cross-linking component in homogeneous solution, is conducted in substance at temperatures below 120° C., preferably about 20° C. – 120° C.

According to a particularly preferred embodiment of this invention, polymerization is conducted in two steps. In the first step, the monomer mixture containing the blocked isocyanate is polymerized at about 20°–120° C. to form a syrupy prepolymer having a viscosity, for example, of about 3,000 centipoise. In a second step, the syrupy prepolymer is hardened at a temperature of about 20°–100° C. This hardening step can be conducted as a batch process by hardening the syrupy prepolymer in flat individual molds. The second step can also be conducted on a continuous basis, for example as disclosed in DT-AS 1 212 301, or between two endless steel bands. The syrupy prepolymer is hardened in this second step in layer thicknesses of several millimeters up to a maximum of several centimeters. It is desirable that an air or water bath be provided to assure adequate removal of the heat of polymerization. Moreover, since the latent cross-linking component contained in the monomer mixture acts as a diluent, controlling the maximum permissible temperature is readily facilitated. In some cases, subsequent heating at a temperature of about 100°– 120° C. is advantageous.

The catalyst employed in practicing this invention is not critical. Suitable catalysts are well known in the art. Typical are the well known radical catalysts, especially the peroxides and azo compounds having decomposition temperatures below about 100° C. Typical of these catalysts are: tert.-butyl perpivalate, tert.-butyl perisobutyrate, tert-butyl peroctoate, benzoyl peroxide, monochlorobenzoyl peroxide, dichlorobenzoyl peroxide, diacetyl peroxide, lauroyl peroxide, cyclohexanone hydroperoxide, di-isopropyl peroxydicarbonate, cyclohexyl peroxidicarbonate, diisooctyl peroxidicarbonate, acetyl cyclohexyl sulfonyl peroxide, acetyl isopropyl sulfonyl peroxide, azobisisobutyric acid nitrile or azo-bis (2,4-dimethyl) valeronitrile.

The molecular weight of the polymerized acrylate resin should be adjusted so that the viscosity (in toluene/dimethyl formamide (1:1) measured at 20° C. in a 2 percent by weight solution) of the coating agent containing the latent cross-linking component is about 0.1–0.3 dl/g. Molecular weight can be controlled by the addition of conventional regulators to the resin-forming monomer mixture. Especially suitable for this purpose are the mercaptans or other mercapto compounds having one or several mercapto groups in the molecule. For instance, octyl mercaptan, n-dodecyl mercaptan, tert.-dodecyl mercaptan, pentanedithiol-(1.5), thioglycol acid ester of monovalent or multivalent alcohols, such as isooctanol, ethylene glycol, 1,4-butanediol, tetraethylene glycol, glycerin, trimethylol propane or pentaerythrite can be employed. The use of multifunctional mercapto compounds is particularly advantageous. Generally, the regulators are employed in amounts of about 0.5–3.0 percent by weight based on the weight of the resin-forming monomer mixture.

There can also be employed in the process of this invention additives conventionally used in preparing powdered lacquers. These additives are frequently used to influence the characteristics of the coating agent, particularly additives to control flow, such as low molecular weight polyacrylates, polyesters, polyurethanes or polycaprolactone diols. The amounts of such additives employed will be apparent to persons skilled in the art.

After polymerization has been completed, there is obtained a resin which is cooled, and which is hard and brittle at room temperature. The resin can be readily crushed. The resin can be completely ground to the grain size required for powder coating. Generally, however, the resin is only crushed to form a relatively course granulated product, which is then mixed with conventional lacquer additives, especially pigments and dyestuffs, and homogenized in a kneader at elevated temperatures of about 90°–120° C. It can then be ground to a powder of the desired particle size.

If pigments and dyestuffs have already been added to the initial mixture, a resin is obtained directly, in one working step, which need be only ground into a powder. The resulting product can then be employed immediately for coating.

The coating agents prepared according to the process of this invention have softening points of about 60°–120° C. The powders obtained by fine grinding flow freely, and exhibit substantially no tendency to form lumps at conventional storage temperatures. The additional use of additives for the improvement of free flow, such as fumed colloidal silica, in amounts of about 0.1–0.5 percent by weight, is possible, but is generally not necessary.

For the purpose of electrostatic powder lacquering, the coating agents prepared according to this invention are usually ground to particle sizes of under about 100 microns. The powders exhibit good melt flow characteristics at temperatures of about 120°–140° C. At about 150° C., cross-linking occurs; thus, baking can be expeditiously carried out at temperatures of about 160°–220° C., preferably about 180°–200° C.

Coating compositions prepared from the coating agents manufactured according to this invention exhibit good adhesion on degreased, but otherwise untreated, sheet steel and on other metals. The coating composition can be baked to form cured coatings possessing excellent mechanical characteristics, good gloss and outstanding weather resistance.

This invention will be more fully understood by reference to the following examples. All parts, proportions, percentages and ratios are by weight unless otherwise indicated.

EXAMPLE 1

Into a container equipped with an agitator, a thermometer and a reflux condenser which is provided with adjustable heating and a vacuum device, is poured a mixture of 39 percent by weight methyl methacrylate, 31 percent by weight butyl acrylate, and 30 percent by weight hydroxyethyl methacrylate, to which are added 0.5% glycol dithioglycolate and 1.5% pentaerythrite-tetrathioglycolate based on the total monomer mixture. In this mixture, 27 percent by weight (in terms of the total mixture) of an adduct of isophorone diisocyanate and hexanediol (ratio 2:1) masked with ε-caprolactam are dissolved at 40° to 50° C. The indicated amount of cross-linking component corresponds to 0.3 equivalents of isocyanate groups based on the hydroxyl content of the monomer mixture. After intensive stirring to obtain a clear solution, 0.05% of azobisisobutyric acid nitrile, based on the total reaction solution, is added as polymerization initiator.

Thereupon the reaction container is closed, evacuated, and the internal temperature is raised to 80° C. Heating and vacuum are adjusted so that a reaction temperature of 80°±2° C. is maintained for the duration of the preliminary polymerization. After approximately 50 minutes, the polymerization product is cooled as quickly as possible to 30°–40° C. It then possesses a viscosity of approximately 2,000 centipoise at 20° C.

For further hardening, 0.3% lauroyl peroxide is added to the preliminary polymerization product. The hardening is conducted in a water bath at 75° C. in a layer thickness of 8 to 20 mm (in individual molds of polyethylene film between perforated aluminum sheets). After approximately 1 to 2 hours, the polymerization product becomes hardened. The plates are tempered at 100° to 110° C. for another two hours. After removal from the mold, the resin plates are crushed to the desired particle size after cooling. The residual monomer content of the resin is 1.5 percent by weight, and the intrinsic viscosity is: 0.220dl/g in toluene/-dimethyl formamide.

As an example of a pigmented powder lacquer containing this resin, the granulated product is mixed with 30% of a $TiO_2$ pigment. The mixture is homogenized in a kneader at 110° to 120° C. as a melt. The duration is 30 to 45 minutes. After solidification, the homogeneous mass is crushed in a ball mill, and then is finely ground in a disk mill. The grain-size fraction above 100μ is separated on a vibration sifter.

For testing, the free-flowing powder is applied with the aid of a commercial electrostatic powder-spraying device onto thoroughly degreased stainless-steel sheets (0.88 mm Erichsen deep-drawing sheets). The voltage used for the negative charge of the powder particles is 60 kv. Baking of the coatings is conducted at 180° C. within 20 minutes. The films, on the average 80μ thick, are flexible, have good adhesion and are glossy. Quick bending of the coated sheet metal by 90° and depression tests according to Erichsen (DIN 53 156) serves as a measure of the flexibility of the films. The coated sheets can be bent without the layer being torn. The deep-drawing strength exceeds 8 mm. Impact deformability of the lacquer layer is characterized by depression on impact, which attains a good value of 3 to 4 mm. Adhesion is evaluated according to a cross-hatching (DIN 53 151). Breaking-off of cutting areas has not been observed; the coefficient GT is 0–1.

Resistance of the coating to chemicals is good as tested by immersion of the lacquered sheets into the below-mentioned solvents for 5 minutes.

| | |
|---|---|
| Gasoline | Not affected |
| Butanone | Not affected |
| Xylene | Not affected |
| Toluene | Not affected |
| Ethanol | Not affected |
| Methanol | Slightly softened |
| Ethyl acetate | Slightly softened |
| Alkali and acid test 10-minute exposure at 70° C.: | |
| Sodium hydroxide (40%) | Not affected |
| Sulfuric acid (40%) | Not affected |

EXAMPLE 2

Into a flask equipped with an agitator, a thermometer and a reflux condenser, is poured a mixture of 1,320 g methyl methacrylate, 1,080 g 2-ethyl hexyl acrylate, 600 g 2-hydroxyethyl methacrylate together with 60 g pentaerythrite-tetrathioglycolate. 0.75 g azobisisobutyric-acid nitrile is dissolved in 20 ml of the mixture which, after attaining a temperature of 70° C., is added to the reaction solution. Before that, 510 g of the adduct of isophorone diisocyanate, and hexandiol (2:1) blocked with ε-caprolactam, is added with stirring to the slowly heating liquid. The adduct is completely dissolved.

After initiation of the polymerization, the temperature of the contents of the flask rises to 100° C, within 30 minutes while the flask is kept in a water bath of 86° C. This temperature peak is maintained only for a short time. After a few minutes the temperature drops to 100° C. In order to stop the reaction, the reaction container is cooled with cold water to 40° C. The cooling period is approximately 30 minutes. The obtained preliminary polymerization product is pourable, and at 40° C. possesses a viscosity of approximately 10 poise.

For the post polymerization, the preliminary polymerization product is mixed at approximately 40° C. with 9 g lauroyl peroxide which has been dissolved in a small amount of methyl methacrylate. The syrup is hardened in a water bath at 75° C., in an hour, in molds of polyethylene film between perforated sheet metal in a layer thickness of approximately 10 mm, and is tempered for 3 hours in a circulating air oven at 105° ± 5° C.

The resulting resin possesses a residual monomer content of methyl methacrylate of 0.25 percent by weight, a hydroxyl number of 86, and an intrinsic viscosity of 0.213dl/g at 20° C. in toluene/dimethyl formamide. The softening range of the resin is 60° to 80° C.

A lacquer powder employing this resin is manufactured as in Example 1, and is applied for testing with the aid of a commercial electrostatic powder sprayer onto degreased steel sheets with a voltage of 60 kv.

The coated sheets are baked in a circulating air oven at 200° C. for 15 minutes. The resulting lacquer films, approximately 70μ thick, are flexible, have good adhesion and are glossy.

Indentation of 8 mm is attained according to Erichsen (DIN 53 156) without the formation of cracks. The cross hatching according to DIN 53 151 is 0 – 1; bending of the lacquered sheets by 90° causes no visible change of the lacquer surface. Otherwise the characteristics of the lacquer correspond to those stated in Example 1.

EXAMPLE 3

According to the method described in Example 2, the following mixture is polymerized.
  35 parts by weight of methyl methacrylate
  30 parts by weight of butyl acrylate
  25 parts by weight of hydroxyethyl methacrylate
  10 parts by weight of styrene
  22 parts by weight of ε-caprolactam-blocked adduct from isophorone diisocyanate and hexanediol
  0.08 parts by weight of azobisisobutryic acid nitrile
  1.5 parts by weight of pentaerythrite-tetrathioglycolate
  0.5 parts by weight of ethylene glycol-dithioglycolate The reaction period is 60 minutes, in which a temperature peak of 112° C. is reached.

The pourable prepolymer is postcatalyzed with 0.4 parts by weight of lauroyl peroxide for hardening in the water bath at 75° C in 1 hour. Subsequently, at 100° C. tempering is conducted for 3 hours in the circulating air oven.

The residual monomer content of the resin is 3 percent by weight. The intrinsic viscosity is 0.275dl/g and the hydroxyl number is 105.

The characterisites of the lacquer films undergo no substantial change through the variation of the monomer composition. The cross hatching test yields a coefficient of 0–1, the indentation according to Erichsen is 8 mm and the bending test does not bring about crack formation.

EXAMPLE 4

According to the method described in Example 1, the following mixture is polymerized:
  49 parts by weight of methyl methacrylate
  21 parts by weight of butyl acrylate
  20 parts by weight of 2-hydroxy-ethyl methacrylate
  10 parts by weight of 4-hydroxy-butyl acrylate
  14 parts by weight of ε-caprolactam-blocked adduct isophorone diisocyanate and hexanediol
  0.05 parts by weight of azobisisobutyric-acid nitrile
  1.20 parts by weight of ethylene glycol-dithioglycolate.

The initiator is added to the solution heated to 70° C. Via the use of reduced pressure, a reaction temperature of 80° C. is maintained for the duration of 45 minutes. The pourable preliminary polymerized product is postcatalyzed for hardening with 0.3 parts by weight of lauroyl peroxide at 40° C. Post polymerization is conducted at 75° C. in the water bath in 1 hour in layer thicknesses of 8 mm. Subsequently tempering is carried out for 2 hours at 110° C. in the circulating air oven.

The lacquer resin has a residual monomer content of 1.5 percent by weight, and intrinsic viscosity is 0.320dl/g.

The baked lacquer films are similar in their characteristics to those of the previously mentioned examples. Impact depression leads to crack formation at 3 mm; however, the cross-hatching, the deep-drawing strength, and the bending elasticity remain unchanged. Due to the low density of cross-links, the resistance to solvents is somewhat lower than in Example 1.

EXAMPLE 5

According to the method described in Example 1, a mixture consisting of
  50 parts by weight of methyl methacrylate
  25 parts by weight of 2-ethyl hexyl acrylate
  15 parts by weight of 2-hydroxy ethyl methacrylate
  10 parts by weight of diacetone acrylamide
  17.8 parts by weight of a ε-caprolactam-blocked adduct from 2 moles isophorone diisocyanate and 1 mole neopentyl glycol
  0.05 parts by weight of azobisisobutyric-acid nitrile
  0.375 parts by weight of ethylene glycol-dithioglycolate
  1.125 parts by weight of pentaerythrite-tetrathioglycolate is polymerized.

The hardening of the preliminary polymerization product is conducted with 0.3 parts by weight of lauroyl peroxide.

Sheets coated by electrostatic powder spraying are baked for 15 minutes at 200° C. The resulting films are elastic, adhesive and glossy. The cross-hatching coefficient is $Gt$ 0 – 1, the Erichsen indentation is 8 mm, and the bending test does not damage the lacquer surface.

EXAMPLE 6

A mixture of
40 parts by weight of methyl methacrylate
28 parts by weight of butyl acrylate
22 parts by weight of 2-hydroxy ethylmethacrylate
10 parts by weight of methyl acrylate
20 parts by weight of a ε-caprolactam-blocked adduct from 2 moles isophorone diisocyanate and 1 mole decandiol
0.05 parts by weight of tert.-butyl peroctoate
1.125 parts by weight of pentaerytarite-tetrathioglycolate
0.375 parts by weight of ethylene glycol-dithioglycolate is polymerized in the above-described manner to a pourable preliminary polymerization product.

For hardening, 0.075 parts by weight of diacetyl peroxide (as 25 percent solution in dimethyl phthalate) are added to the preliminary polymerization product. Post polymerization takes place at 75° C. in the water bath in 1 hour; tempering takes place at 105° C. in 2 hours.

The residual monomer content of the obtained resin is 2 percent, the intrinsic viscosity is 0.253dl/g. Sheets coated by electrostatic powder spraying are baked for 10 minutes at 220° C.

EXAMPLE 7

The following mixture is polymerized to a pourable preliminary polymerization product:
50 parts by weight of methyl methacrylate
25 parts by weight of 2-ethyl hexyl acrylate
20 parts by weight of 2-hydroxy propyl methacrylate
5 parts by weight of acrylic acid
25 parts by weight of an adduct from 1 mole hexamethylene diisocyanate (1,6) and 2 moles caprylolactam
0.1 parts by weight of lauroyl peroxide
1.9 parts by weight of tetraethylene glycol-dithioglycolate.

Preliminary polymerization takes place in 45 minutes at 80° C.

After repeating initiation by means of 0.3 parts by weight of lauroyl peroxide, the preliminary polymerization product is hardened at 75° C. in 1 hour in layers of 8 mm thickness in a water bath, and is tempered at 105° C. in 2½ hours.

The obtained resin shows a residual monomer content of 1.5 percent by weight and an intrinsic viscosity of 0.242dl/g.

The baked films produced with this agent have good adhesion, and are flexible and glossy.

EXAMPLE 8

According to Example 1, a mixture consisting of
44 parts by weight of methyl methacrylate
31 parts by weight of butyl acrylate
25 parts by weight of 2-hydroxy ethyl methacrylate
13 parts by weight of an adduct from 1 mole hexamethylene diisocyanate (1,6) and 2 moles caprylolactam
0.01 part by weight of 2,2'-azo-bis(2,4 dimethyl-valeronitrile)
0.04 parts by weight of azo-bis-isobutyric-acid nitrile
1.2 parts by weight of ethylene glycol-dithioglycolate is polymerized.

The preliminary polymerization takes place at 80° C. in 45 minutes.

For completion of the polymerization, a peroxide mixture consisting of equal parts of lauryol peroxide and ter. butyl peroctoate in a total amount of 0.4 percent by weight, in terms of the monomer mixture, is added. Hardening takes place between metal molds lined with foil in a water bath at 70° C. in 2 hours, and subsequently 4 hours in a circulating air oven at 100° C.

The obtained resin is characterized by an intrinsic viscosity of 0.245dl/g and a residual monomer content of 1.3 percent by weight.

After processing of the resin to form an electrostatically sprayable powder, steel sheets coated with the powder are baked for 20 minutes at 180° C. The baked films show good adhesion according to a cross-hatching coefficient of 0–1, excellent flexibility with respect to impact and tensile stress, which is manifested in impact depression of 4 mm and a deep-drawing strength of more than 8 mm. Quick bending of the lacquered metal sheets does not result in damage to the surface.

EXAMPLE 9

The direct manufacture of pigmented resin can be conducted according to the following procedure.

A first a mixture of
50 parts by weight of methyl methacrylate
30 parts by weight of 2-ethyl hexylacrylate
20 parts by weight of 2-hydroxy ethyl methacrylate
5 parts by weight of an adduct from 1 mole hexamethylene diisocyanate (1,6) and 2 moles ε-caprolactam
10 parts by weight of a ε-caprolactam-blocked adduct from 2 moles isophorone diisocyanate and 1 mole hexandiol
0.05 parts by weight of azobisisobutyric acid nitrile
1.125 parts by weight of pentaerythrite-tetra-thioglycolate and
0.375 parts by weight of ethylene glycol-dithioglycolate is converted into a pourable preliminary polymerization product at 80° C. in 45 minutes.

Approximately one third of the cooled syrup is removed for the dispersion of 30 percent by weight of titanium pigment, in terms of the total mixture. The pigment dispersion is subsequently combined with the remaining polymerized product with intensive stirring.

After the addition of 0.3 parts by weight of lauroyl peroxide, the pigmented preliminary polymerization product is at first hardened for 90 minutes in a water bath at 70° C., and finally for 180 minutes at 105° C. in a circulating air oven.

The cooled resin can be easily broken up and ground to a particle size of below 100μ. After sheets are powder coated, the sheets are baked for 15 minutes at 200° C. The subsequent test of the lacquer films yields the following results.

| | |
|---|---|
| Layer thickness: | 70 μ |
| Erichsen indentation | 8 mm |
| cross-hatching | 0 – 1 |
| Bending test | No cracks |

EXAMPLE 10

From a mixture consisting of:
40 parts by weight of methyl methacrylate
30 parts by weight of 2-ethyl hexyl acrylate
20 parts by weight of 4-hydroxy butyl acrylate
10 parts by weight of acrylonitrile
15 parts by weight of an adduct from 1 mole p-xylenediisocyanate and 2 moles ε-caprolactam
0.11 parts by weight of 2,2'-azo-bis(2,4-dimethyl valeronitrile)
1.3 parts by weight of butanediol-dithioglycolate, a preliminary polymerization product is manufactured.

At constant external heating to 87° C., the reaction temperature rises in the polymerization vessel to 98° C. after addition of half of the amount of initiator. After a decrease in the temperature, the remaining initiator is added. After a polymerization period of 40 minutes a pourable syrup is obtained, which is mixed at 40° C. with 0.4 parts by weight of a peroxide mixture consisting of lauroyl peroxide and tert.-butyl peroctoate at a ratio of 1:2, and is hardened at first in a water bath in individual molds at 75° C. for 90 minutes, then in a circulating air oven for 3 hours at 105° C.

The polymerization product has an intrinsic viscosity of 0.230dl/g, a residual monomer content of 2 percent by weight and and OH number of 85.

The resin is processed in a well-known manner into an electrostatically sprayable lacquer powder, which yields glossy, flexible and impact resistant lacquer films.

| | |
|---|---|
| Layer thickness | 70 – 80μ |
| Erichsen indentation | 8 mm |
| cross-hatching | 0 – 1 |
| Bending test | No cracks |

What is claimed is:

1. In a process for the preparation of a pulverizable, thermosetting coating agent based on a mixture of an acrylic resin containing hydroxyl groups prepared by substance polymerization of a resin-forming monomer mixture and a blocked isocyanate, the improvement wherein said process comprises dissolving in said monomer mixture about 0.1–0.9 equivalents of isocyanate groups based on the hydroxyl groups, said isocyanate groups derived from at least one di- or polyisocyanate blocked with at least one lactam having about 4–12 carbon atoms, said blocked isocyanate having a melting point of about 60° – 150°C, and polymerizing said monomer mixture at a temperature below about 120°C and in the presence of a catalyst.

2. Process according to claim 1 in which the isocyanate groups are about 0.2–0.5 equivalents based on the hydroxyl groups.

3. Process according to claim 1 in which the isocyanate is blocked with ε-caprolactam.

4. Process according to claim 2 in which the isocyanate is blocked with ε-caprolactam.

5. Process according to claim 1 in which the blocked isocyanate is an aliphatic, araliphalatic or cycloaliphatic blocked di- or polyisocyanate.

6. Process according to claim 3 in which the blocked isocyanate is an aliphatic, araliphalatic or cycloaliphatic blocked di- or polyisocyanate.

7. Process according to claim 4 in which the blocked isocyanate is an aliphatic, araliphalatic or cycloaliphatic blocked di- or polyisocyanate.

8. Process according to claim 1 in which the blocked isocyanate is a blocked urethane isocyanate.

9. Process according to claim 2 in which the blocked isocyanate is a blocked urethane isocyanate.

10. Process according to claim 3 in which the blocked isocyanate is a blocked urethane isocyanate.

11. Process according to claim 4 in which the blocked isocyanate is a blocked urethane isocyanate.

12. Process according to claim 1 in which the monomer mixture having uniformly dissolved therein the blocked isocyanate is polymerized in two steps by: (a) polymerizing said mixture at about 20° – 120° C. to form a syrupy prepolymer and (b) hardening said prepolymer in a layer having a thickness below about 20 mm at a temperature of about 20° – 100° C.

13. A process for the prepartion of pulverizable, thermosetting coating agents based on an acrylic resin containing hydroxyl groups and a blocked isocyanate, said process comprising preparing a resin-forming monomer mixture comprising
  1. about 50 – 90 weight percent of at least one ester of methacrylic acid or acrylic acid with an alcohol having about 1 – 20 carbon atoms;
  2. about 10 – 50 weight percent of at least one olefinically unsaturated monomer containing hydroxyl groups and copolymerizable with (1);
  3. about 0 – 15 weight percent of a monomer selected from the group consisting of methacrylic acid, acrylic acid, methacrylic acid amide, acrylic acid amide, N-substituted methacrylic acid amide, N-substituted acrylic acid amide, styrene, α-methyl styrene, acrylonitrile, vinyl acetate, vinyl propionate, vinyl alkyl ethers having about 1 – 8 carbon atoms in the alkyl group, methacrylonitrile, allyl acetate, vinyl chloride and vinylidene chloride; and dissolving in said monomer mixture about 0.1 – 0.9 equivalents of isocyanate groups based on the hydroxyl groups, said isocyanate groups derived from at least one di- or polyisocyanate blocked with at least one lactam having about 4 – 12 carbon atoms, said blocked isocyanate having a melting point of about 60° – 150° C.;
and polymerizing said monomer mixture at a temperature below about 120° C. and in the presence of a catalyst.

14. Process according to claim 13 in which the monomer mixture comprises
  1. about 60–80 weight percent of a mixture of the methyl ester of methacrylic acid and at least one monomer selected from the group consisting of methyl acrylate, ethyl acrylate, n-propyl acrylate, isopropyl acrylate, butyl acrylate, 2-ethyl-hexyl acrylate, n-octyl acrylate, dodecyl acrylate, butyl methacrylate, hexyl methacrylate, decyl methacrylate, and cyclohexyl methacrylate; and
  2. about 20–40 weight percent of at least one monomer selected from the group consisting of the 2-hydroxyethyl, 2-hydroxy-propyl and 4-hydroxybutyl esters of acrylic and methacrylic acid,
the amount of said methyl ester of methacrylic acid being about 30 – 60 weight percent based on the total monomer mixture.

15. Process according to claim 13 in which component (1) is about 60–80 percent by weight of the monomer mixture.

16. Process according to claim 15 in which component (2) is about 20–40 percent by weight of the monomer mixture.

17. Process according to claim 16 in which component (1) is at least one ester of methacrylic acid or acrylic acid having 1 – 20 carbon atoms in the alcohol component, and further in which the alcohol component is derived from an aliphatic or cycloaliphatic alcohol.

18. Process according to claim 17 in which component (3) is about 1 – 10 percent by weight of the monomer mixture.

19. Process according to claim 17 in which component (1) is methyl methacrylate.

20. Process according to claim 19 in which the methyl methacrylate comprises about 30 to about 60 weight percent of the total monomer mixture.

21. Process according to claim 17 in which the monomer mixture includes a softening ester selected from the group consisting of: acrylic acid methyl ester, acrylic acid ethyl ester, acrylic acid-n-propyl ester, acrylic acid isopropyl ester, acrylic acid butyl ester, acrylic acid-2-ethyl-hexyl ester, acrylic acid-n-octyl ester, acrylic acid dodecyl ester, methacrylic acid butyl ester, methacrylic acid hexyl ester, methacrylic acid-2-ethyl-hexyl ester, methacrylic acid decyl ester and methacrylic acid cyclohexyl ester.

22. Process according to claim 17 in which component (2) is the 2-hydroxy ethyl ester of acrylic acid, the 2-hydroxy propyl ester of acrylic acid, the 4-hydroxy butyl ester of acrylic acid, the 2-hydroxy ethyl ester of methacrylic acid, the 2-hydroxy propyl ester of methacrylic acid, the 4-hydroxy butyl ester of methacrylic acid, the hydroxy ethyl ester of maleic acid, the hydroxy propyl ester of maleic acid, the hydroxy butyl ester of maleic acid, the hydroxy ethyl ester of fumaric acid, the hydroxy propyl ester of fumaric acid, the hydroxy butyl ester of fumaric acid, the hydroxy ethyl ester of itaconic acid, the hydroxy propyl ester of itaconic acid, or the hydroxy butyl ester of itaconic acid.

23. Process according to claim 22 in which the isocyanate is selected from the group consisting of hexamethylene diisocyanate, octamethylene diisocyanate, decamethylene diisocyanate, dodecamethylene diisocyanate, $\omega,\omega'$-diisocyanato-1,4-dimethylbenzene (p-xylylenediisocanate) and isophorone diisocanate.

24. Process according to claim 22 in which the isocyanate is the adduct formed by reacting two moles of isophorone diisocyanate with one mole of hexanediol, decanediol, tetraethylene glycol, neopentyl glycol or 1,4-bis-hydroxy-methyl cyclohexane, or the adduct formed by reacting three moles of isophorone diisocyanate with one mole of trimethylol propane or hexanetriol.

25. Process according to claim 23 in which the isocyanate is blocked with $\epsilon$-caprolactam, capryl lactam or lauryl lactam.

26. Process according to claim 24 in which the isocyanate is blocked with $\epsilon$-caprolactam, capryl lactam or lauryl lactam.

27. Process according to claim 13 in which the blocked di- or polyisocyanate is substantially soluble at room temperature in the resin-forming monomer mixture.

28. Process according to claim 17 in which polymerization is conducted at about 20°–120°C.

29. Process according to claim 23 in which the polymerization is conducted at about 20°–120°C.

30. Process according to claim 24 in which the polymerization is conducted at a temperature of about 20°–120°C.

31. Process according to claim 28 in which the reaction mixture is subsequently heated at a temperature of about 100° – 120°C.

32. Process according to claim 13 in which the monomer mixture includes a radical catalyst selected from the group consisting of peroxides and azo compounds having decomposition temperatures below about 100°C.

33. Process according to claim 24 in which the molecular weight of the polymerized acrylate resin is adjusted so that the viscosity of a coating agent containing a latent cross-linking component is about 0.1 – 0.3 dl/g.

34. Process according to claim 33 in which the monomer mixture includes about 0.5 – 3.0 weight percent, based on the weight of the resin-forming monomer mixture, of a molecular weight regulator selected from the group consisting of mercaptans having one or more mercapto groups in the mercaptan molecule.

* * * * *